United States Patent
Kanigicherla et al.

(10) Patent No.: US 8,972,624 B2
(45) Date of Patent: Mar. 3, 2015

(54) USB VIRTUALIZATION

(75) Inventors: Balaji Kanigicherla, Andhra Pradesh (IN); Siva Raghuram Voleti, Hyderabad (IN); Surya Narayana Dommeti, Hyderabad (IN); Krishna Mohan Tandaboina, Hyderabad (IN); Rajani Lotti, Hyderabad (IN)

(73) Assignee: Ineda Systems Pvt. Ltd., Hyderabad (IN)

( * ) Notice: Subject to any disclaimer, the term of this patent is extended or adjusted under 35 U.S.C. 154(b) by 0 days.

(21) Appl. No.: 14/111,404

(22) PCT Filed: Apr. 9, 2012

(86) PCT No.: PCT/IN2012/000251
§ 371 (c)(1),
(2), (4) Date: Oct. 11, 2013

(87) PCT Pub. No.: WO2012/140668
PCT Pub. Date: Oct. 18, 2012

(65) Prior Publication Data
US 2014/0032794 A1  Jan. 30, 2014

(30) Foreign Application Priority Data
Apr. 11, 2011 (IN) .............................. 1259/CHE/2011

(51) Int. Cl.
G06F 3/00 (2006.01)
G06F 13/28 (2006.01)
G06F 13/10 (2006.01)
(52) U.S. Cl.
CPC ................ *G06F 13/28* (2013.01); *G06F 13/10* (2013.01)
USPC ....................... 710/28; 710/5; 710/22; 710/36
(58) Field of Classification Search
None
See application file for complete search history.

(56) References Cited

U.S. PATENT DOCUMENTS

| 6,546,450 | B1 | 4/2003 | Liu |
| 2003/0177297 | A1 | 9/2003 | Hesse et al. |
| 2004/0030840 | A1* | 2/2004 | Hesse et al. ................... 711/137 |
| 2009/0303521 | A1* | 12/2009 | Kumar ........................ 358/1.15 |

FOREIGN PATENT DOCUMENTS

| CN | 1639701 | 7/2005 |
| CN | 101488941 | 7/2009 |

* cited by examiner

*Primary Examiner* — Idriss N Alrobaye
*Assistant Examiner* — David Martinez
(74) *Attorney, Agent, or Firm* — Workman Nydegger

(57) ABSTRACT

Described herein are methods and systems for virtualization of a USB device to enable sharing of the USB device among a plurality of host processors in a multi-processor computing system. A USB virtualization unit for sharing of the USB device include a per-host register unit, each corresponding to a host processor includes one or more of a host register interface, host data interface, configuration registers, and host control registers, configured to receive simultaneous requests from one or more host processors from amongst the plurality of host processors for the USB device. The USB virtualization unit also includes a pre-fetch direct memory access (DMA) configured to pre-fetch DMA descriptors associated with the requests to store in a buffer. The USB virtualization unit further includes an endpoint specific switching decision logic (ESL) configured to schedule data access based on the DMA descriptors from the host processor's local memory corresponding to each request.

14 Claims, 3 Drawing Sheets

USB VIRTUALIZATION

TECHNICAL FIELD

The present subject matter, in general, relates to multi-host processors devices and, in particular, to USB host controllers for multi-host processors.

BACKGROUND

Computing systems, such as laptops, netbooks, workstations, and desktop computers typically include a central processing unit (CPU), also known as a host processor, running an operating system for carrying out various functionalities of the computing system. The host processor generally includes software modules, known as drivers, for interacting with and controlling various peripheral devices connected to the computing systems for providing various functionalities of the computing systems. The peripheral devices include, for instance, mass storage devices, media devices, such as audio players for providing output of audio files playing in the computing system, and modems for connecting to a network environment. For example, the mass storage and media devices may be universal serial bus (USB) based devices.

Further, the system drivers generally interact with the peripheral devices through hardware interfaces, known as host controllers provided in the computing systems for controlling the peripheral devices. For example, the computing systems include USB host controllers for controlling and communicating with the USB devices connected to the computing systems.

SUMMARY

This summary is provided to introduce concepts related to a Universal Serial Bus (USB) virtualization unit to allow sharing of USB devices by more than one host controller in a computing device having multi-host processors, which are further described in the detailed description. This summary is not intended to identify essential features of the present subject matter nor is it intended for use in determining or limiting the scope of the present subject matter.

In one implementation, a multi-host USB virtualization unit for sharing of a USB device among multiple host processors in a multi-host computing system is described. The USB virtualization unit may include a per-host register unit, each corresponding to a host processor from amongst a plurality of host processors, comprising one or more of a host register interface, host data interface, configuration registers, and host control registers, configured to receive simultaneous requests from one or more host processors from amongst the plurality of host processors for the USB device, wherein the requests are based on types of endpoint supported by the USB device. The USB virtualization unit also includes a pre-fetch direct memory access (DMA) configured to pre-fetch DMA descriptors associated with the requests to store in a buffer, wherein the DMA descriptors are indicative of pointers describing location of corresponding host processor's local memory associated with the request.

The USB virtualization unit may further include an endpoint specific switching decision logic (ESL) configured to schedule access of data based on the DMA descriptors from the host processor's local memory corresponding to each request, based on class specific driver schedule of the USB device, wherein the class specific driver schedule is indicative of the endpoint details of the USB device.

In another implementation, the USB virtualization unit interfaces a USB host controller of the computing system to two or more host processors. The USB virtualization unit emulates a host processor to the USB host controller, and at the same time, the USB virtualization unit presents itself as a dedicated USB host controller to each of the host controllers.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale.

DETAILED DESCRIPTION

Figure 1:
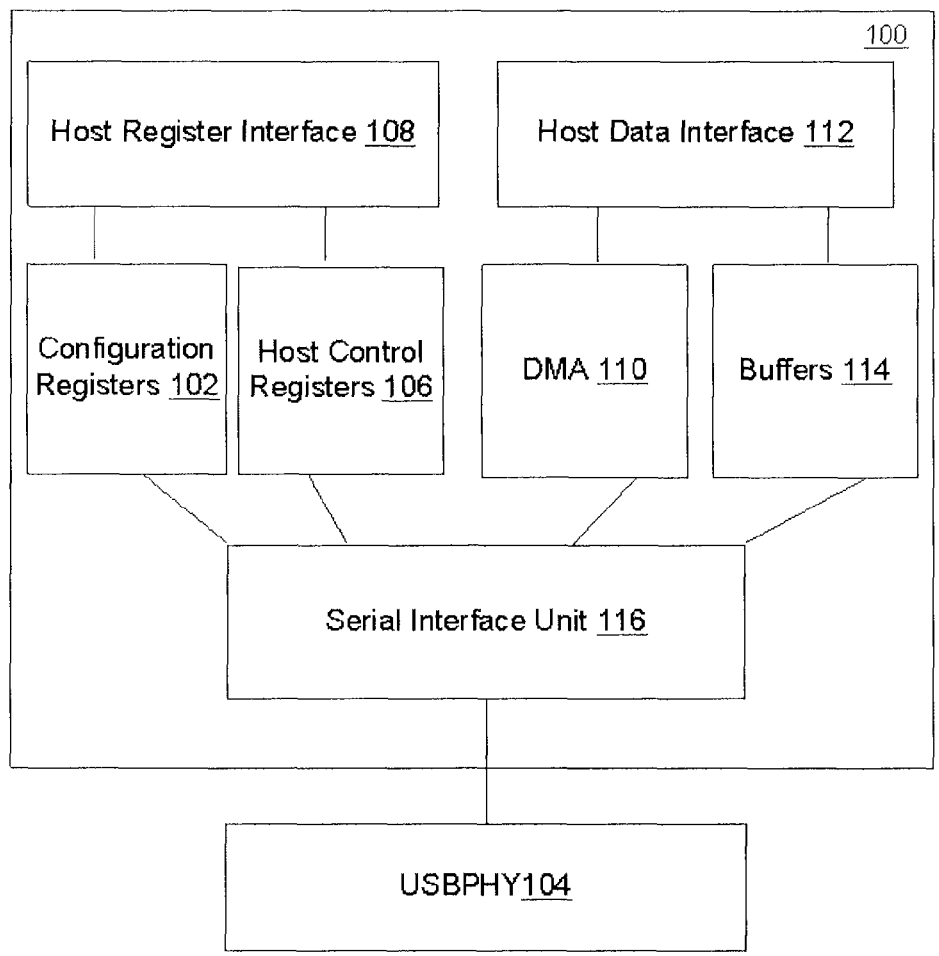
FIG. 1 illustrates a typical Universal Serial Bus (USB) host controller, in accordance with an embodiment of the present subject matter.

The present subject matter describes a method and system for sharing of Universal Serial Bus (USB) devices by multiple host processors in a multi-host computing system. Examples of such computing systems include, but are not restricted to, computing devices, such as mainframe computers, workstations, personal computers, desktop computers, minicomputers, servers, multiprocessor systems, and laptops; cellular communicating devices, such as a personal digital assistant, a smart phone, and a mobile phone; and the like.

With the advent of technology, computing systems with multiple processors supporting different operating systems have come into existence. In order to reduce system costs and power consumption, the host processors are configured to share the same peripheral devices and device controllers. Sharing the same peripheral devices and the device controllers however, may not be possible in cases when both the host processors need to access the same peripheral device simultaneously. A host processor, which was not initially using a particular peripheral device, may thus need to wait for another host processor that is currently using the peripheral device, to release the peripheral device, thus affecting the experience of a user using the second host processor.

A variety of USB devices, such as storage devices, media devices, and communication devices can be accessed by a host processor of the computing system through a USB host controller. A typical USB host controller may be configured to support a single USB device or multiple USB devices. The USB devices connect to the USB host controllers through USB PHY ports. Accordingly, the USB host controller may support either a single USB PHY port or multiple USB PHY ports. The USB PHY ports can be used to interface different USB devices, such as Open Host Controller Interface (OHCI) or Enhanced Host Controller Interface (EHCI) standard compliant USB devices to the computing system.

Typically, the USB host controller works with a single host processor and operates on predefined protocols. For example, the USB PHY port, such as a standard USB 2.0 port requires a host processor to use an EHCI controller while a standard USB1.x port requires an OHCI controller. The host processor controls the USB host controller, which in-turn controls the USB PHY ports. The EHCI and OHCI standards provide register programming model to be supported by the USB host controllers. Along with the register programming model, the USB host controllers are supposed to follow the command and data descriptor structures defined by the respective standards. EHCI and OHCI compatible USB devices support different data rates. The EHCI devices support data rates up to 480 Mbits/s whereas the OHCI devices support data rates up to 12 Mbits/s. For the host processor to communicate with both the EHCI and the OHCI compatible USB devices, the USB host controller requires to support both the standards.

The communication of the typical USB device with the host processor takes place through logical channels, known as pipes. Each of the USB devices includes logical entities called endpoints that connect to the USB host controller through the pipe. The USB device can have a maximum of 32 endpoints and minimum of one endpoint which is the control endpoint. An endpoint, as known in the art, can be one out of the four types, namely, isochronous, interrupt, bulk, and control, depending on the nature of transfer supported by the endpoint. Further, communication between the host processor and the USB device takes place in accordance with packet based transfer protocols. Accordingly, a transaction between the host processor and the USB device may include packets, such as start of frame, token, optional data, and status packets. Details which are conventionally known in the art to a person skilled in the art have been omitted for the sake of brevity.

The communication of the USB device with the host processor is generally initiated with device enumeration. By enumerating the USB device, the host processor is enabled to obtain all information, from the USB device, relevant for the communication with the USB device. The host processor can obtain information, such as the capabilities that are supported by the USB device, the number of endpoints the USB device has, and types of endpoints supported by the USB device. Further, the host processor also determines the class of the USB device. For example, the class of the USB device may be mass storage, communication link, and so on. In addition to acquiring the information regarding each of the USB devices, each of the USB devices connected to the host processor is assigned a unique device number. The device number so assigned is used by the host processor to address the USB device in course of the communication between the USB device and the host processor.

The communication between the USB device and the host processor is initiated once the USB device is enumerated. The description of the communication between the USB device and the host processor is explained in reference to FIG. 1. FIG. 1 displays a typical USB host controller. The typical USB host controller, hereinafter referred to as a USB host controller 100, is configured to interface with a single host processor (not shown in figure) and likewise the host processor typically interacts with the USB host controller 100 in a manner that the USB host controller 100 is a dedicated one.

The USB host controller 100 includes configuration registers 102, such as EHCI or OHCI registers depending on the standard supported by the USB host controller 100. Host control registers 106 that can be programmed by the host processor for enabling the transfers to USB devices (not shown in figure) through one or more USB PHY port 104. Based on the interface protocol followed by the host processor, additional registers may be required for host's interaction with the USB host controller 100. For example, if the host controller connectivity with the host processor is based on the standard, such as Peripheral Component Interconnect (PCI) or Peripheral Component Interconnect Express (PCIe) standard, additional registers, such as PCI or PCIe configuration registers, alike the configuration registers 102, need to be implemented in the USB host controller 100 to enable the communication of the host processor with the USB host controller 100 and the device based on EHCI/OHCI standards. Specific details conventionally available to one skilled in the art have been omitted for the sake of brevity.

Consider a communication between the host processor and the USB device where the host processor needs to write some data onto the USB device. For this purpose, the host processor generates a relevant command and places this command in a local memory of the host processor. A pointer to the command is placed in the host control register 106 of the USB host controller 100. The host control register 106 and the configuration registers 102 of the USB host controller 100 are interfaced to the host processor through a host register interface 108 as shown in the figure.

Based on the pointer, the command is fetched by a direct memory access (DMA) block, hereinafter referred to as DMA 110, through a host data interface 112. The command includes descriptors, which are interpreted to obtain information, such as location of the local memory of the host processor where the data to be transferred is stored, type of endpoint through which the data needs to be sent to the USB device and so on. Thereupon, the data to be transferred is fetched from the local memory of the host processor and is placed in the local memory of the USB host controller 100. The local memory of the USB host controller 100 may include one or more buffers, hereinafter referred to as buffers 114. In one example, the buffers 114 may be first-in-first-out (FIFO) type registers. From the buffers 114, the data to be transferred is accessed by a serial interface unit (SIU) 116. The SIU 116 is configured to schedule the transfer of the data to the USB device through the USB PHY port 104 by arbitrating between the endpoints present in the USB device. The arbitration by the SIU 116 may be based on conventional arbitration techniques and are not elaborated for the ease of description.

In order to allow multiple host processors to simultaneously access the USB device, the host USB controller 100 needs to virtualize the multiple host processors to USB PHY port 104 in such a way that from the perspective of each of the host processors, the USB PHY port 104 appears as if the USB PHY port 104 is dedicated to the host processor, while simultaneously from a perspective of the USB device, it should appear to the USB device that all transfers are being initiated by the single host processor. For these purposes, the virtualization techniques are implemented.

In general, the virtualization techniques, such as I/O virtualization is a methodology which transforms accesses between standard I/O devices and the host processors such that the I/O devices can be shared across multiple system images or hosts in a way which hides the sharing from both the host processor and the shared I/O devices. In computing systems supporting I/O virtualization, address remapping is generally used to enable assignment of the I/O devices to the host processors.

Examples of the I/O devices may include USB devices, storage devices, communication devices, human interface devices, audio devices, etc. Conventional I/O devices are not multi-host aware devices In other words, native I/O devices are not configured to deal with more than one host. Accordingly, the virtualization techniques need to ensure that these I/O devices are imparted with the capability to interact with the multiple hosts. To reiterate, in case of the USB devices, the virtualization is needed since the conventionally available host processors are configured to work with a dedicated USB host controller and similarly conventional USB devices are configured to interact with a single host and are incapable of interacting with more than one host processors.

According to one embodiment of the present subject matter, methods and systems for concurrent sharing of the USB devices by the multiple hosts in the multi-host computing system is described. For the purpose, in one embodiment of the present subject matter a USB virtualization unit is implemented. The USB virtualization unit interfaces the multiple host processors to a USB host controller of the multi-host computing system without bringing about any change in the pre-existing configuration of the host processors or the USB host controller. The USB virtualization unit appears as the host controller when viewed from a host processor's side, while it emulates a host processor on the USB host controller's side. Thus, the USB virtualization unit communicatively couples a conventional host processor, configured to work with a dedicated USB host controller and a conventional USB host controller, which is capable of being controlled by a single host processor, so that USB devices may be shared by the multiple host processors in the multi-host computing system.

In one implementation, the USB virtualization unit allows multiple host processors to share the same set of USB PHY ports 104 to access the USB devices connected thereto. The USB virtualization unit may be a standalone unit or independent unit associated with the USB host controller 100 while in another embodiment the USB virtualization unit may be implemented as a logical/function module within the USB host controller 100. While the latter embodiment may be preferred for more compact computing devices, the former embodiment may be useful in adopting legacy or native USB host controllers to the multi-host processor environment. It will be appreciated that in the two aforementioned embodiments, as well as those that will be explained later, the USB virtualization unit may have a hardware implementation, a software implementation or a combination thereof.

The methods and systems for sharing of the USB devices in the multi-host computing systems are hereinafter explained in a detailed manner with reference to FIGS. 2 and 3. The systems and methods can be implemented in a variety of computing systems. The multi-host computing system may include, but are not limited to, desktop computers, hand-held devices, laptops or other portable computers, mobile phones, personal digital assistants (PDA's), tablet personal computers, netbooks, workstations, and the like which implement multiple processors on the same hardware platform. In one implementation, the methods and systems for sharing of USB devices can be implemented for multi-host computing systems running any operating system, such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

Figure 2:
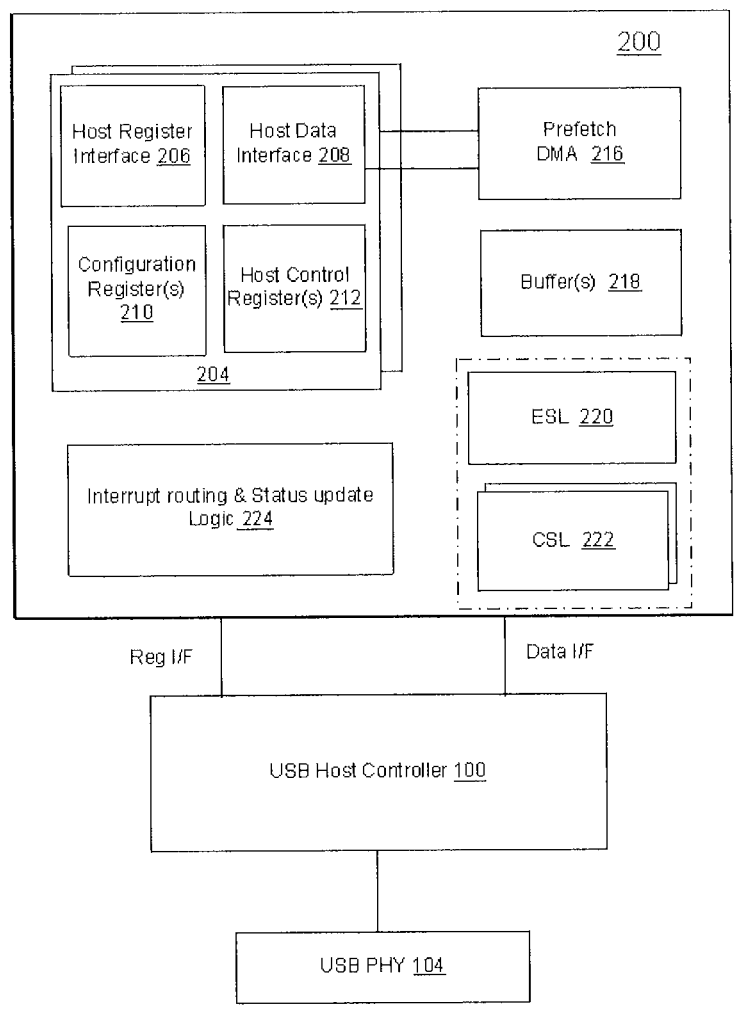
FIG. 2 illustrates an exemplary USB virtualization unit, in accordance with an embodiment of the present subject matter.

FIG. 2 illustrates an exemplary multi-host USB virtualization unit 200, in accordance with an embodiment of the present subject matter, referred to as USB virtualization unit 200 hereinafter. In one embodiment, the USB virtualization unit 200 is implemented in a multi-host computing system (not shown in figure). For example, the multi-host computing system may include two host processors, host 1 and host 2 (not shown in figure), where each host processor supports an operation system, to perform different functions on the same hardware platform. Each operating system may provide a particular advantage over the other operation system in the computing system. For example, host 1 and host 2 may run two different operating systems, OS 1 and OS 2, where the OS 1 may provide better performance or support more applications than the OS 2 however, the OS 2 may consume less resources, such as memory, processing power, battery power when compared to the OS 1. In such a scenario, the computing system may implement the OS 1 for application processing and computational purposes whereas may implement the OS 2 for low power applications during idle state of OS1.

The USB virtualization unit 200 interfaces the host 1 and host 2 to a USB host controller 100 of the computing system. For this purpose, register and data interfaces (not shown in figure) are provided between the hosts 1 and host 2, respectively, and USB virtualization unit 200. Similarly, register and data interfaces are also provided between the USB virtualization unit 200 and the USB host controller 100. In one embodiment, the USB host controller 100 may be a conventional USB host controller as explained in context of FIG. 1 and the USB virtualization unit 200 may be an external module interfaced with the USB host controller 100. However, in another embodiment, the USB host controller 100 may be configured such that the USB virtualization unit 200 is integrated therein.

The USB virtualization unit 200 includes per-host register units 204. The per-host register units 204 are as many in number as the number of host processors in the computing system. The each per-host register unit 204 includes a host register interface 206 and host data interface 208 to interface the USB virtualization unit 200 with their respective host processor. Further, the per-host register unit 204 may also include configuration registers 210 and host control registers 212. It may be noted that since the USB virtualization unit 200 is configured to appear as a typical USB host controller to each of the host processors, the configuration of registers in each of the per-host register unit 204 is similar to that in a typical USB host controller.

For example, consider a scenario where host 1 and host 2 need to communicate with a USB storage device (not shown in Figure) connected to a USB PHY port 104 of the computing system. The host 1 and the host 2 will accordingly generate appropriate commands and place the same in their local memories. Likewise, the data to be transferred will also be placed in their respective local memories. Pointers to the commands in the local memories of the host 1 and the host 2 are placed in the respective host control register 212 of the per-host register units 204 associated with the host 1 and the host 2.

Based on the pointers, the commands are fetched from the local memories of the host 1 and the host 2 by a pre-fetch direct memory access (PDMA) block of the USB virtualization unit 200 through the host data interfaces 208 of the respective per-host register units 204. The pre-fetch direct memory access (PDMA) block is hereinafter referred to as PDMA 216. As explained previously, the commands include descriptors that have information, such as location of the local memories of the host processors where the data to be transferred is stored, type of endpoint through which the data needs to be sent to the USB device and so on. Accordingly, the descriptors are extracted to determine the locations of the local memory of the host 1 and the host 2 where the data to be transferred is stored.

The data in the local memory of the host 1 and the host 2 is fetched and placed in a local memory component, i.e., buffers 218, of the USB virtualization unit 200. The command fetching as well as the data fetching performed by the USB virtualization unit 200 is in such a manner that it is understood by the host 1 and the host 2 as being performed by a USB host controller 100 independently dedicated to host 1 and host 2, respectively. Similarly, once the command and data from the host 1 and host 2 have been fetched onto the local memory of the USB virtualization unit 200, the same is handled by the USB host controller 100 in the same way as a typical USB host controller handles data in the local memory of a host processor to transfer it to the USB PHY port 104.

Accordingly, the command and data from the two hosts 1 and 2 needs to be viewed by the USB host controller 100 as data stored in the local memory of one host processor. For this purpose, the USB virtualization unit 200 includes an endpoint specific switching decision logic, referred to as ESL 220, and a class specific logic, referred to as CSL 222. The ESL 220, based on inputs from the CSL 222, arbitrates between the different host processors to schedule the fetching of the command and data from the different host processors. The functionality of the ESL 220 and the CSL 222 may be explained with reference to the following example. It should also be understood that the examples provided herein are merely illustrative in nature and should not be construed as a limitation.

For instance, consider a situation where the hosts 1 and 2 wish to communicate with a keyboard. The keyboard may include, for example, a bulk endpoint and a control endpoint. In an embodiment, the ESL 220 is aware of the endpoints present in any USB device connected to the USB PHY port 104. As known conventionally, at the time of installation of any peripheral device, like a USB device, device specific drivers corresponding to the USB device, are installed with the host processor. The device specific drivers for any USB device, connected to the host processor, are class specific drivers and are loaded onto the kernel of the host processors. The class specific drivers are aware of the endpoints associated with the class of peripheral devices to which the present USB device belongs. In the present example, to install the keyboard with the hosts 1 and 2, the class specific drivers corresponding to the class of USB devices to which the keyboard belongs, are installed with the host 1 and the host 2. The class specific driver's schedules or command descriptors provide endpoint related details to the ESL 220.

In the present example, since the class driver is aware that the keyboard includes bulk and control endpoints, the class driver schedules only bulk and controls related transfers from the host 1 as well the host 2, ignoring isochronous and interrupt type transfers. Further, while the ESL 220 performs arbitration for those endpoints by fetching commands from the host 1 and the host 2 it ensures that a complete command is fetched from a host processor before switching to the next host processor and at the same time the transition is seamless, i.e., a host processor should not interpret the transition as an interruption in its communication with the USB device and should continue to comprehend the USB device, being shared among the multiple host processors, as a dedicated one. In the previous example, if the host 1 sends a bulk command to the keyboard and the host 2 sends a control command to the keyboard, the ESL 220 fetches the complete bulk command from the host 1 before it proceeds to the host 2 to fetch the control command or vice versa. To enable such a switching, a logical command boundary for the switching between the host 1 and the host 2 is determined.

In one embodiment, the CSL 222 is configured to determine the logical boundaries for the switching. The CSL 222 indicates these logical boundaries to the ESL 220 for the switching. For each USB device specifications, such as numbers of endpoint implemented by the USB device, the number of endpoint transfers required for each of the endpoints, and type of endpoint transfers required, pre-exist with the CSL 222. In other words, the CSL 222 understands the kind of USB device that is attached and indicates a stateless transition point to the ESL 220 depending on specifications of the attached USB device. As evident, the USB virtualization unit 200 may include different CSL 222 based on the different class of USB devices it can handle. Further, the CSL 222 parses class level commands, for example, SCSI commands associated with mass storage devices, within the endpoint specific data packets and determines a logical point where switching over to a different host processor is valid. A logical command point or boundary may be understood as a point at which occurrence of a transition from the one host processor to the other will not corrupt the device data. Similarly, while different hosts are accessing different files from a USB device, interleaving should not result in situations where a file opened by host 1 appears to be corrupted due to interleaved accesses from the host 2. Such a situation is avoided when the transition from one host processor to another occurs at a logical command point or boundary.

While the commands from different host processors are interleaved, one host processor's specific view (or context) of the USB device should not change. For example, if host 1 and host 2 are working with a USB device and during the transitions, if the host 2 places a command for safe removal of the USB device or sends a low power mode request, the host 1 commands may not be accepted by the device (due to change in the context). To avoid this situation, ESL 220 blocks commands from host's which result in device context change and give a dummy response to the respective host. Similarly, when the host 2 alone is active in the above example, the USB safe removal related commands might be allowed to reach the USB device and the corresponding responses from the USB device might be directly routed to the host 2 without any intervention.

In other words, power state of the USB device corresponding to other hosts is identified before sending the command to the USB device where the propagation of the low power mode request to the USB device is restricted upon determining an active state of the USB device for any one host. In such a situation, a dummy completion signal may be sent to the at least one host processor in response to the low power mode request, where the dummy completion may be indicative of a successful completion of the low power mode request for the particular host.

Referring again to the previous example where the host 1 sending the bulk command and the host 2 sending the control command are concurrently communicating with the keyboard. The bulk command may involve four bulk transfers for the bulk command to be fetched completely while the completion of the control command may require three control transfers. Accordingly, the CSL 222 determines that the ESL 220 may switch from the host 1 to the host 2 at the end of the fourth bulk transfer corresponding to host 1 for fetching the commands from host 2.

The USB virtualization control unit 200 also takes care of enabling enumeration of the USB device by different hosts, either one after another or simultaneously. In one embodiment, the USB virtualization unit 200 parses the enumeration responses from the USB device during the enumeration by different hosts. For example, host 1 and host 2 may simultaneously enumerate the USB device for sending commands to the USB device. In such situations, the USB virtualization unit 200 may intercept the enumeration process of each host processor and to receive a unique USB device number for each host.

It should be appreciated that the unique USB device number may be unique for each host and its connected USB devices, however may be identical for different hosts connected to the USB device. For example, host 1 may assign a number 1 to the USB device while enumeration. This unique number 1 may not be assigned by the host 1 to any other USB device. Further, the host 2 may also assign a number 1 to the USB device which is unique to the host 2 and is not assigned by the host 2 to any other USB device. In another implementation, the host 1 may assign a unique USB device number 2 to the USB device whereas the host 2 may assign a unique USB device number 3 to the USB device.

In one implementation, the USB virtualization unit 200 may intercept the enumeration of both the hosts, host 1 and host 2. Upon interception of the enumeration, the USB virtualization unit 200 may provide a universal USB device number to the USB device. In said implementation, the universal USB device number may be independent of the unique USB device numbers allocated by different hosts. For example, the USB virtualization unit 200 may assign a unique USB device number 8 to the USB device where host 1 has assigned a unique USB number 1 to the USB device similar to the host 2. The assignment of the universal USB device number to the USB device may ensure that due to multiple host processor device enumeration, the USB device configurations are not mutually thrashed.

In another implementation, the USB virtualization unit 200 may also assign a universal USB device number to the USB device that is common with one of the host processors unique USB device number. For example, during an enumeration of host 1 and host 2, host 1 may assign a unique USB device number 2 to the USB device while the host 2 may assign a unique USB device number 3 to the USB device. The USB virtualization unit 200 may assign a universal USB device number 3 to the USB device.

Since the USB virtualization unit 200 stores the unique USB device number for each host and the universal USB device number, during communication the USB virtualization unit 200 may replace the unique USB device number field in one hosts command with the universal USB device number. Similarly, the USB virtualization unit 200 may also translate the universal USB device number to the respective unique USB device number in the response packets from the USB device for the host processor.

Therefore, as described before, the multi-host USB virtualization unit 200 for sharing of a USB device among multiple host processors in a multi-host computing system may comprise the per-host register unit 204, a pre-fetch DMA 216, and the ESL 220. Each per host register unit may each correspond to a host processor from multiple coupled host processors including the host register interface 206, the host data interface 208, the configuration registers 210, and the host control registers 212. The per host register unit may initialize registers for the multiple host processors to share the USB device. Further, the pre-fetch DMA 216 may be configured to pre-fetch the direct memory access (DMA) descriptors associated with requests to store in the buffer 218, where the DMA descriptors indicate pointers describing location of a local memory of a host processor, and where the location is associated with each of the request. The ESL 220 may be configured to schedule data access, from the local memory of each of the multiple host processors based on a class specific driver schedule of the USB device, where the class specific driver schedule is based on the endpoint supported by the USB device.

It will also be appreciated by those skilled in the art that the words during, while, simultaneously, concurrently, and when as used herein are not exact terms that mean an action takes place instantly upon an initiating action but that there may be some small but reasonable delay, such as a propagation delay, between the initial action and the reaction that is initiated by the initial action.

Once the commands from all the host processors are fetched, they are read to determine the memory location in the local memories of the host processor where the host processors would have placed their respective data to be transferred to the USB device. The commands include descriptors that are extracted to obtain pointers to the data in the respective local memories. The ESL 220 schedules the fetching of the data from the respective local memories by ensuring that the requirements, such as bandwidth and data rate are complied with. The PDMA 216 fetches the data accordingly and places them in the buffers 218.

Thereupon, commands need to be sent to the USB host controller 100 for it to start fetching the data from the buffer 218 and transfer them to the USB PHY port 104. This implies that relevant commands having descriptors indicative of the location in the buffers 218 that holds the data from the host processors need to be recreated and provided to the USB host controller 100.

In one implementation, the ESL 220 regenerates the commands and places them in the buffers 218. The recreated commands are in accordance with the endpoints in the USB device to which the transfer is affected. A pointer to this command is placed in the host control register of the USB host controller 202. In one implementation, for each type of endpoints in the USB device, the ESL 220 creates a final queue in the buffer 218 based on endpoint specific queues received from different host processors. The USB host controller 100 is configured to fetch the descriptors from the final queue.

Further, processing of the pointer is similar to that explained previously in reference to FIG. 1. As will be apparent to one skilled in the art, since the USB virtualization unit 200 emulates a host processor to the USB host controller 100, the fetching of command and data from the local memory of the USB virtualization unit 200 by the USB host controller 100 and transferring the same to the USB device connected USB PHY port 104 is accomplished with the intervention of a serial interface unit (not shown in figure) of the USB host controller 100.

During the process of communication between the host processors and the USB device, the interrupts are routed to the appropriate host processor and the status per host processor is continuously updated through an interrupt routing and status update module 224. Depending on which host processor is being serviced, that specific host's status and interrupt registers are updated by the interrupt routing and status update module 224.

Methods and systems for sharing of USB devices in multi-host computing systems running multiple operating systems are described. While aspects of the described systems and methods can be implemented in any number of the different computing systems, environments, and/or configurations, the embodiments are described in the context of the above exemplary system architecture(s). For the ease of understanding, the explanation herein is in context of a multi-host computing system having two host processors. However, it will be appreciated by one skilled in the art, that although the methods and systems have been described with respect to the two host processors, the concept explained in context thereto may be extend to any number of the host processors.

Figure 3:
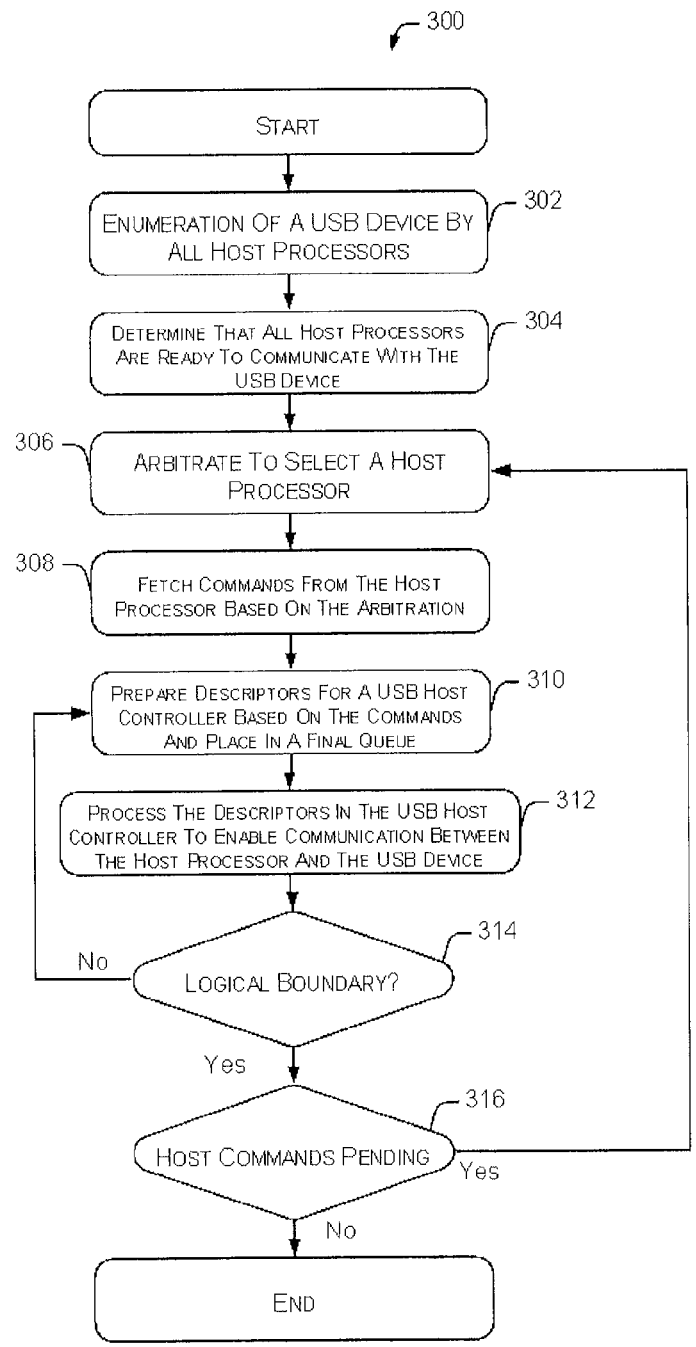
FIG. 3 illustrates an exemplary method of virtualization of USB devices, according to an embodiment of the present subject matter.

FIG. 3 illustrates an exemplary virtualization method 300 for sharing USB devices amongst more than the one host processor in a multi-host computing system according to one embodiment of the present subject matter. The method 300 may be implemented in a variety of computing systems, mentioned in description of FIG. 2, in several different ways. For example, the virtualization method 300, described herein, may be implemented using the USB virtualization unit 200 described above.

The virtualization method 300, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method.

The order in which the virtualization method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof.

The virtualization method 300 is initiated at block 302 where all the host processors enumerate the USB device that is to be accessed by the host processors. In one embodiment USB virtualization unit 200 allows one host processor to enumerate the USB device and start intercepting the subsequent enumeration requests from the other host processors.

At block 304, a determination that all host processors are active is made. In other words, it is determined that the host processors are ready to start communication with the USB device. Upon determining that multi host processors are ready, the virtualization method 300 proceeds to block 306 where an arbitration starts per endpoint basis. The arbitration takes place to schedule fetching of commands from each of the host processors in a logical and sequential manner. In one embodiment, the arbitration is accomplished by the ESL 220 and the CSL 222 discussed above. On the basis of the arbitration, the fetching of commands from a selected host processor takes place at block 308. In one embodiment, the fetched commands are placed in a local memory of the USB virtualization unit 200.

At block 310, descriptors are prepared for the USB host controller 100 and stored in the local memory of the USB virtualization unit 200 in a final queue. The descriptors may be understood as commands that the USB virtualization unit 200, emulating a host processor with respect to the USB host controller 100, generates for the USB host controller 100. As apparent, descriptors are the commands that are recreated by the USB virtualization unit 200 based on the commands from the host processors. The ESL 220 is configured to insert the descriptors relating to the commands from each of the host processors in the final queue that is processed by the USB host controller 100.

At block 312, the USB host controller 100 processes the descriptors to enable communication between the host processors and the USB device in a manner previously described in relation to FIG. 2. Further, upon execution of a command from a host processor, a status update to the effect is provided to the host processor.

The logical command boundary for arbitration is determined by the CSL 222 as explained previously. Occurrence of the logical command boundary is determined, at block 314. If the logical command boundary occurs ('YES' branch of the block 314), at block 316, it is ascertained whether there are pending commands from other host processors, else, if the occurrence of the logical command boundary is awaited, the process flow returns to block 310 ('NO' branch of the block 314). Further, if commands from any host processors are pending ('YES' branch of the block 316), arbitration and fetching of command from the next host processor is allowed (the process flow returns to the block 306). The process completes in case no pending commands exists, ('NO' branch of the block 316).

It will be appreciated that the depicted sequence of execution of the blocks 308 to 316 is only illustrative and the same may be changed. In one example, descriptors based on the commands from one host processor may be prepared and put in the final queue before fetching commands from the next host processor. In another example, the commands from the host processors may be obtained first, followed of preparation of descriptors and the final queue. In yet another example, the fetching and preparation of descriptors may be done simultaneously.

Although implementations of a virtualization unit and a virtualization method have been described in language specific to structural features and/or methods, it is to be understood that the invention is not necessarily limited to the specific features or methods described. Rather, the specific features and methods are disclosed as exemplary implementations for the virtualization unit and virtualization.

We claim:

1. A method of virtualization of a Universal Serial Bus (USB) device in a multi host computing system comprising:
   receiving simultaneous requests from a plurality of host processors for the USB device coupled to the multi host computing system, wherein the requests are based on types of endpoint supported by the USB device;
   pre-fetching, for each of the plurality of host processors, direct memory access (DMA) descriptors, wherein each of the DMA descriptor is indicative of pointers describing location of a local memory of a host processor, the location being associated with a request; and
   scheduling data access, from the local memory of each of the plurality of host processors based on a class specific driver schedule of the USB device, wherein the class specific driver schedule is based on an endpoint supported by the USB device.

2. The method as claimed in claim 1, wherein the method further comprises:
   parsing a data access from the local memory of at least one of the plurality of host processors to identify command boundaries based on the endpoint associated with the data access, and wherein the command boundaries are indicative of logical boundaries of a command; and
   arbitrating to initiate another data access from the local memory of another of the plurality of host processors based at least on the identified command boundaries.

3. The method as claimed in claim 1, wherein the method further comprises formulating a final queue of the DMA descriptors corresponding to each endpoint based on the requests.

4. The method as claimed in claim 1, wherein the plurality of host processors is running one of heterogeneous and homogenous operating systems.

5. The method as claimed in claim 1, the method comprising:

enumerating the USB device for each of the plurality of host processors of the multi-host computing system, wherein the USB device is shared simultaneously among the plurality of host processors through a single USB host controller and a single USB PHY port;

initializing a plurality of configuration registers and host control registers for the enumerated USB device, wherein each of the plurality of configuration registers and the host control registers correspond to each of the plurality of host processors;

assigning a unique USB device number to the enumerated USB device corresponding to each of the plurality of host processors for receiving simultaneous requests from the plurality of host processors, wherein the unique USB device number corresponding to each of the plurality of host processor is stored in a local memory of a multi-host USB virtualization unit (200) enabling sharing of the USB device; and allocating a universal USB device number to the USB device for communicating with the USB virtualization unit (200) for sharing the USB device among the plurality of host processors, wherein the host processors share the USB device as a dedicated USB device based on one or more of the respective unique USB device number, corresponding configuration registers, and corresponding host control registers.

6. The method as claimed in claim 5, wherein the enumerating comprises one or more of determining capabilities supported by the USB device, identifying number of end points supported by the USB device, identifying type of endpoints, and a class of the USB device.

7. The method as claimed in claim 1, wherein the method further comprises:

receiving a low power mode request from at least one of the plurality of host processors;

identifying power state of the USB device corresponding to other host processors among the plurality of host processors;

restricting a propagation of the low power mode request to the USB device upon determining an active state of the USB device for at least one host processor from amongst the other host processors; and sending a dummy completion signal to the at least one host processor in response to the low power mode request, wherein the dummy completion status is indicative of a successful completion of the low power mode request.

8. The method as claimed in claim 7, wherein the method further comprises:

sending the low power mode request to the USB device upon determining low power state of the USB device corresponding to the other host processors; and forwarding a completion signal from the USB device to the at least one host processor in response to the low power mode request.

9. A multi-host USB virtualization unit (200) for sharing of a USB device among multiple host processors in a multi-host computing system comprising:

a plurality of per-host register unit (204), each corresponding to a host processor from amongst a plurality of host processors, comprising one or more of a host register interface (206), host data interface (208), configuration registers (210), and host control registers (212); configured to initialize registers for the plurality of host processors to share the USB device;

a pre-fetch DMA (216) configured to pre-fetch, direct memory access (DMA) descriptors associated with requests to store in a buffer (218), wherein the DMA descriptors are indicative of pointers describing location of a local memory of a host processor, the location being associated with each of the request; and an endpoint specific switching decision logic (ESL) (220) configured to schedule data access, from the local memory of each of the plurality of host processors based on a class specific driver schedule of the USB device, wherein the class specific driver schedule is based on an endpoint supported by the USB device.

10. The multi-host USB virtualization unit (200) as claimed in claim 9 further comprising:

a class specific logic (222) configured to parse a data access from the local memory of at least one of the plurality of host processors to identify command boundaries based on the endpoint associated with the data access, and wherein the command boundaries are indicative of logical boundaries of a command; and the ESL (220) configured to arbitrate to initiate another data access from the local memory of another of the plurality of host processors based at least on the identified command boundaries.

11. The multi-host USB virtualization unit (200) as claimed in claim 9, wherein the ESL (220) is further configured to formulate a final queue of the DMA descriptors corresponding to each endpoint based on the requests.

12. The multi-host USB virtualization unit (200) as claimed in claim 9, wherein the per-host register unit (204) is further configured to:

enumerate the USB device for each of the plurality of host processors of the multi-host computing system, wherein the USB device is shared simultaneously among the plurality of host processors through a single USB host controller and a single USB PHY port;

initialize a plurality of configuration registers and host control registers for the enumerated USB device, wherein each of the plurality of configuration registers and the host control registers correspond to each of the plurality of host processors;

assign a unique USB device number to the enumerated USB device corresponding to each of the plurality of host processors for receiving simultaneous requests from the plurality of host processors, wherein the unique USB device number corresponding to each of the plurality of host processor is stored in a local memory of the multi-host USB virtualization unit (200) enabling sharing of the USB device; and allocate a universal USB device number to the USB device for communicating with the USB virtualization unit (200) for sharing the USB device among the plurality of host processors, wherein the host processors share the USB device as a dedicated USB device based on one or more of the respective unique USB device number, corresponding configuration registers, and corresponding control registers.

13. The multi-host USB virtualization unit (200) as claimed in claim 9 further comprising interrupt routing and status update logic (224) configured to:

receive a low power mode request from at least one of the plurality of host processors;

identify power state of the USB device corresponding to other host processors among the plurality of host processors; wherein the USB device is shared simultaneously among the plurality of host processors; and restrict a propagation of the low power mode request to the USB device upon determining an active state of the USB device for at least one host processor from amongst the other host processors; and send a dummy completion signal to the at least one host processor in response to the low power mode request, wherein the dummy completion signal is indicative of a successful completion of the low power mode request.

14. The multi-host USB virtualization unit (200) as claimed in claim 13, wherein the interrupt routing and status update logic (224) is further configured to:

send the low power mode request to the USB device upon determining low power state of the USB device corresponding to the other host processors; and forward a completion signal from the USB device to the at least one host processor in response to the low power mode request.

* * * * *